United States Patent
McCaffrey

(10) Patent No.: US 11,280,202 B2
(45) Date of Patent: Mar. 22, 2022

(54) BALANCED COMPOSITE ROOT REGION FOR A BLADE OF A GAS TURBINE ENGINE

(71) Applicant: United Technologies Corporation, Farmington, CT (US)

(72) Inventor: Michael G. McCaffrey, Windsor, CT (US)

(73) Assignee: Raytheon Technologies Corporation, Farmington, CT (US)

(*) Notice: Subject to any disclaimer, the term of this patent is extended or adjusted under 35 U.S.C. 154(b) by 26 days.

(21) Appl. No.: 16/841,126

(22) Filed: Apr. 6, 2020

(65) Prior Publication Data

US 2021/0310363 A1 Oct. 7, 2021

(51) Int. Cl.
*F01D 5/30* (2006.01)
*F01D 5/28* (2006.01)
*F01D 5/14* (2006.01)

(52) U.S. Cl.
CPC ............ *F01D 5/282* (2013.01); *F01D 5/147* (2013.01); *F01D 5/284* (2013.01); *F01D 5/3084* (2013.01); *F05C 2253/04* (2013.01); *F05D 2230/60* (2013.01); *F05D 2240/80* (2013.01); *F05D 2300/2261* (2013.01); *F05D 2300/6033* (2013.01); *F05D 2300/6034* (2013.01)

(58) Field of Classification Search
CPC .......... F01D 5/147; F01D 5/282; F01D 5/284; F01D 5/3084; F05D 2240/80
See application file for complete search history.

(56) References Cited

U.S. PATENT DOCUMENTS

| | | | |
|---|---|---|---|
| 3,749,518 A * | 7/1973 | Alver | F01D 5/282 416/230 |
| 4,343,593 A | 8/1982 | Harris | |
| 4,802,824 A | 2/1989 | Gastebois et al. | |
| 5,791,877 A | 8/1998 | Stenneler | |
| 9,228,445 B2 | 1/2016 | Darkins, Jr. et al. | |
| 9,598,967 B2 | 3/2017 | Xu | |
| 10,202,853 B2 * | 2/2019 | Kleinow | F01D 5/284 |
| 2016/0222802 A1 * | 8/2016 | Holowczak | F01D 5/3092 |
| 2018/0100400 A1 | 4/2018 | De Gaillard et al. | |
| 2020/0072065 A1 | 3/2020 | Sippel et al. | |

FOREIGN PATENT DOCUMENTS

WO    2014099102 A1    6/2014

OTHER PUBLICATIONS

EP Search Report dated Aug. 21, 2021 issued for related European Patent Application No. 21165704.4.

* cited by examiner

*Primary Examiner* — Ninh H. Nguyen
(74) *Attorney, Agent, or Firm* — Bachman & LaPointe, P.C.

(57) ABSTRACT

A rotor blade for a gas turbine engine including an inner ply layer group includes a flared region and an airfoil region, a neck region between the flared region and the airfoil region; and a platform shell that comprises a platform shell root region, a platform shell platform region, and a platform shell neck region between the platform shell root region and the platform shell platform region, the platform shell root region sheathes the flared region, and the platform shell neck region flares outwardly away from the neck region to intersect the platform shell platform region at a platform shell neck region perimeter around an airfoil opening perimeter.

18 Claims, 13 Drawing Sheets

BALANCED COMPOSITE ROOT REGION FOR A BLADE OF A GAS TURBINE ENGINE

BACKGROUND

This application relates generally to a gas turbine engine blade and more specifically to a vortical platform shell of composite blades.

Gas turbine engines, such as those that power modern commercial and military aircraft, generally include a compressor to pressurize an airflow, a combustor to burn a hydrocarbon fuel in the presence of the pressurized air, and a turbine to extract energy from the resultant combustion gases. Air is compressed in various fan and compressor stages by rotor blades which cooperate with stator vanes. Fan air provides bypass propulsion thrust while compressor air is mixed with fuel and ignited for generation of hot combustion gases from which energy is extracted by a turbine section which powers the compressor and fan sections.

The turbine section often includes blades formed from ceramic matrix composites ("CMC") which may have relatively low interlaminar properties such that attachment regions between a platform region and airfoil region may be subject to significant interlaminar stress. Integrating the platform may be a challenge in transmitting the centrifugal load into the root region. Loss of bond has been shown analytically to cause distortions which may further increase the platform loads, leading to a cascading structural load increase.

SUMMARY

A blade for a gas turbine engine according to one disclosed non-limiting embodiment of the present disclosure includes an inner ply layer group comprising a flared region and an airfoil region, a neck region between the flared region and the airfoil region; and a platform shell that comprises a platform shell root region, a platform shell platform region, and a platform shell neck region between the platform shell root region and the platform shell platform region, the platform shell root region sheathes the flared region, and the platform shell neck region flares outwardly away from the neck region to intersect the platform shell platform region at a platform shell neck region perimeter around an airfoil opening perimeter.

A further embodiment of any of the foregoing embodiments of the present disclosure includes that the platform shell comprises a platform shell center of gravity located outboard of a center point of a contact width at which the platform shell root region contacts a disk attachment lug of an associated blade slot.

A further embodiment of any of the foregoing embodiments of the present disclosure includes that the platform shell center of gravity is located to create a net moment operable to rotate the platform shell platform region toward the inner ply layer group, wherein the platform shell neck region at the platform shell platform region roll inward toward the inner ply layer group during operation of the gas turbine engine such that the platform shell neck region operates in compression.

A further embodiment of any of the foregoing embodiments of the present disclosure includes that the platform shell neck region flares outwardly to intersect with the platform shell platform region at the platform shell neck region perimeter, the platform shell platform region comprises a first thickness inboard of the platform shell neck region perimeter and a second thickness outboard of the platform shell neck region perimeter, the first thickness different than the second thickness.

A further embodiment of any of the foregoing embodiments of the present disclosure includes that the platform shell neck region flares outwardly to intersect with the platform shell platform region at the platform shell neck region perimeter, the platform shell platform region comprises a first thickness inboard of the platform shell neck region perimeter and a second thickness outboard of the platform shell neck region perimeter, wherein the first thickness inboard of the platform shell neck region perimeter defines a first center of gravity at a first cross-section, and the second thickness outboard of the platform shell neck region perimeter defines a second center of gravity at the first cross-section, the first center of gravity and the second center of gravity positioned to minimize a rolling moment located at a point Z at the first cross-section on the platform shell neck region perimeter during operation of the gas turbine engine.

A further embodiment of any of the foregoing embodiments of the present disclosure includes that the platform shell comprises a multiple of pieces that are assembled together around the inner ply layer group.

A further embodiment of any of the foregoing embodiments of the present disclosure includes, further comprising a low density ceramic foam between the platform shell neck region and the inner ply layer group.

A blade for a gas turbine engine according to one disclosed non-limiting embodiment of the present disclosure includes an inner ply layer group comprising a flared region and an airfoil region, a neck region between the flared region and the airfoil region; and a platform shell that comprises a platform shell root region, a platform shell platform region, and a platform shell neck region between the platform shell root region and the platform shell platform region, wherein the platform shell neck region at the platform shell platform region roll inward toward the inner ply layer group during operation of the gas turbine engine such that the platform shell neck region operates in compression.

A further embodiment of any of the foregoing embodiments of the present disclosure includes that the platform shell root region sheathes the flared region, and the platform shell neck region flares outwardly away from the neck region to intersect the platform shell platform region at a platform shell neck region perimeter.

A further embodiment of any of the foregoing embodiments of the present disclosure includes that the platform shell neck region perimeter surrounds an airfoil opening perimeter.

A further embodiment of any of the foregoing embodiments of the present disclosure includes that the platform shell comprises a platform shell center of gravity located outboard of a center point of a contact width at which the platform shell root region contacts a disk attachment lug of an associated blade slot.

A further embodiment of any of the foregoing embodiments of the present disclosure includes that the platform shell comprises a platform shell center of gravity located outboard of a center point of a contact width at which the platform shell root region contacts a disk attachment lug of an associated blade slot.

A further embodiment of any of the foregoing embodiments of the present disclosure includes that the platform shell center of gravity is located to create a net moment operable to rotate the platform shell platform region toward the inner ply layer group.

A further embodiment of any of the foregoing embodiments of the present disclosure includes that the platform shell neck region flares outwardly to intersect with the platform shell platform region at the platform shell neck region perimeter, the platform shell platform region comprises a first thickness inboard of the platform shell neck region perimeter and a second thickness outboard of the platform shell neck region perimeter, the first thickness different than the second thickness.

A further embodiment of any of the foregoing embodiments of the present disclosure includes that the platform shell neck region flares outwardly to intersect with the platform shell platform region at the platform shell neck region perimeter, the platform shell platform region comprises a first thickness inboard of the platform shell neck region perimeter and a second thickness outboard of the platform shell neck region perimeter, wherein the first thickness inboard of the platform shell neck region perimeter defines a first center of gravity at a first cross-section, and the second thickness outboard of the platform shell neck region perimeter defines a second center of gravity at the first cross-section, the first center of gravity and the second center of gravity positioned to minimize a rolling moment located at a point Z at the first cross-section on the platform shell neck region perimeter.

A method of manufacturing a rotor blade of a gas turbine engine according to one disclosed non-limiting embodiment of the present disclosure includes determining a platform shell center of gravity to be outboard of a center point of a contact width at which a platform shell root region contacts a disk attachment lug of an associated blade slot; and adjusting an intersection of a platform shell neck region that flares outwardly away from a neck region of an inner ply region to intersect the platform shell platform region at a platform shell neck region perimeter around an airfoil opening to minimize a local bending moment.

A further embodiment of any of the foregoing embodiments of the present disclosure includes that the platform shell neck region is between a platform shell root region and the platform shell platform region.

A further embodiment of any of the foregoing embodiments of the present disclosure includes that the platform shell root region sheathing a flared region that defines the center point of the area of contact.

A further embodiment of any of the foregoing embodiments of the present disclosure includes that adjusting the intersection further comprises adjusting the platform shell platform region to roll inward toward the inner ply layer group during operation of the gas turbine engine.

A further embodiment of any of the foregoing embodiments of the present disclosure includes that the platform shell neck region operates in compression.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
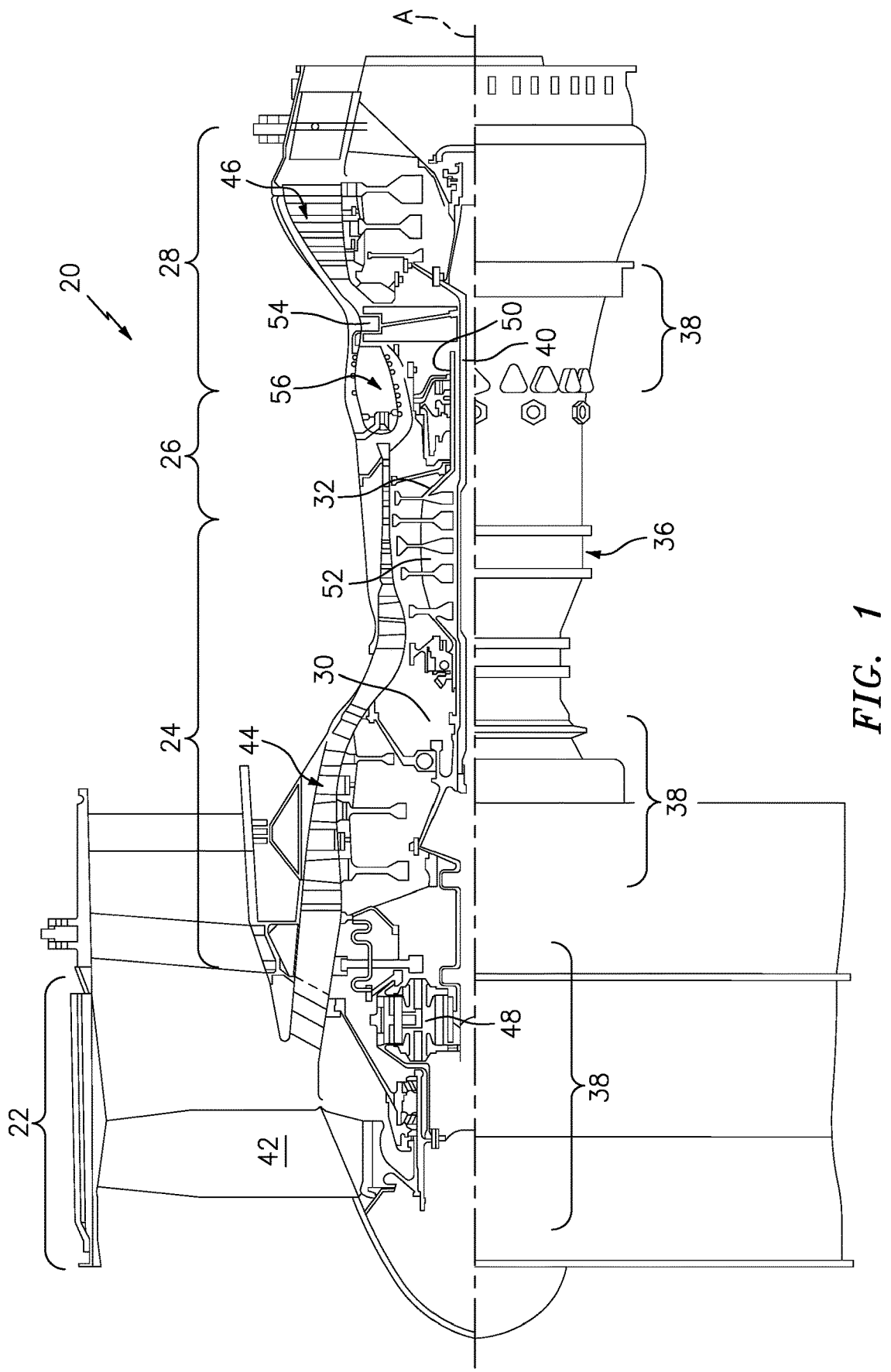
FIG. 1 is a schematic cross-section of an example gas turbine engine architecture.

FIG. 1 schematically illustrates a gas turbine engine 20. The gas turbine engine 20 as disclosed herein is a two spool turbofan that generally incorporates a fan section 22, a compressor section 24, a combustor section 26, and a turbine section 28. The fan section 22 drives air along a bypass flowpath while the compressor section 24 drives air along a high temperature core flowpath for compression and communication into the combustor section 26, then expansion through the turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine case structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54.

Figure 2:
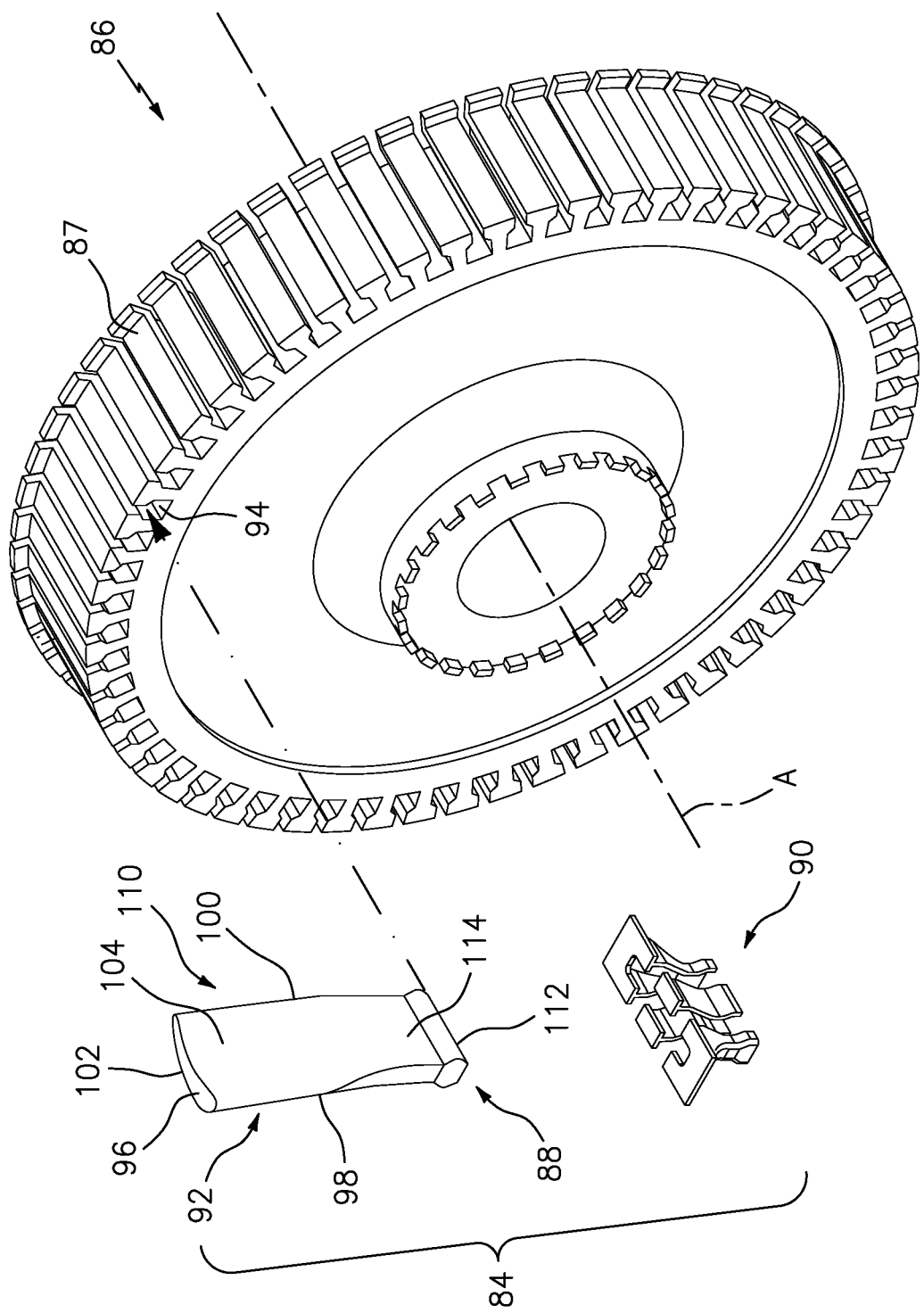
FIG. 2 is an exploded view of a rotor assembly with a single representative ceramic matrix composite turbine blade.

With reference to FIG. 2, a rotor assembly 60 such as a turbine rotor assembly includes an array of blades 84 (one shown) circumferentially disposed around a disk 86. The disk 86 may be subtractive or additive manufactured of nickel-based super alloys that operate in high temperature environments, such as, for example, environments typically encountered by aerospace and gas turbine engine hot section components. In some embodiments, the nickel-based alloy may be Inconel 718, Waspaloy, IN-100.

Each blade assembly 84 includes a root region 88, a platform shell 90 and an airfoil 92. The platform shell 90 separates a gas path side inclusive of the airfoil 92 and a non-gas path side inclusive of the root region 88. The airfoil 92 defines a blade chord between a leading edge 98, which may include various forward and/or aft sweep configurations, and a trailing edge 100. A first sidewall 102 that may be convex to define a suction side, and a second sidewall 104 that may be concave to define a pressure side are joined at the leading edge 98 and at the axially spaced trailing edge 100. The tip 96 extends between the sidewalls 102, 104 opposite the platform 90.

Each blade root region 88 of the platform shell 90 is received within one blade slot 94 in a rim 87 of the disk 86 such that the airfoil 92 extends therefrom and the platform shell 90 at least partially protects the rim 87. In the illustrated embodiment, a blade assembly 84 is disclosed in detail, however other composite components which require attachment such as the root region 88 to include but not be limited to vanes, blade outer air seals, struts, etc., will also benefit herefrom.

Each blade assembly 84 may be manufactured of a composite material such as ceramic matrix composite (CMC) or an organic matrix composite (OMC) material. The composite materials typically include prepreg ceramic plys that include prepreg ceramic fiber tows. The tows in each ply are arranged adjacent to one another in a planar orientation such that each ply has a unidirectional orientation. Examples of CMC materials include, but are not limited to, carbon-fiber-reinforced carbon (C/C), carbon-fiber-reinforced silicon carbide (C/SiC), silicon-carbide-fiber-reinforced silicon carbide (SiC/SiC), alumina-fiber-reinforced alumina ($Al_2O_3/Al_2O_3$), organic matrix composite (e.g. carbon fiber epoxy) or combinations thereof. The CMC may have increased elongation, fracture toughness, thermal shock, dynamic load capability, and anisotropic properties as compared to a monolithic ceramic structure. Other CMC materials may utilize tackified ceramic fabric/fibers whereby the fibers have not been infiltrated with matrix material, 3D weave architectures of dry fabrics, and others. Although CMCs are primarily discussed in the disclosed embodiment, other such non-metallic materials may also be utilized to form the component.

Manufacture of the blade assembly 84 typically includes laying up pre-impregnated composite fibers within a matrix material (prepreg) to form the geometry of the part (pre-form), autoclaving and burning out the pre-form, infiltrating the burned-out pre-form with the melting matrix material, then final machining and treatments of the pre-form. Infiltrating the pre-form may include depositing the ceramic matrix out of a gas mixture, pyrolyzing a pre-ceramic polymer, chemically reacting elements, sintering, generally in the temperature range of 1700-3000 F (925-1650 C), or electrophoretically depositing a ceramic powder. With respect to airfoils, the composites may be located over a metal spar and form only the outer surface of the airfoil.

The blade assembly 84 may be loaded primarily in one direction (radial pull) that have been created in ceramic matrix composite (CMC) or organic matrix composite (OMC) material with relatively direct ply orientations having minimal bending. An inner ply layer group 110 includes a flared region 112 that may at least partially form a teardrop, fir-tree, or other shape of the root region 88 that receives the platform shell 90. The inner ply layer group 110 may include a flared region 112 below a neck 114. The inner ply layer group 110 continues radially outward with respect to the engine axis to at least partially form the airfoil 92.

Figure 3:
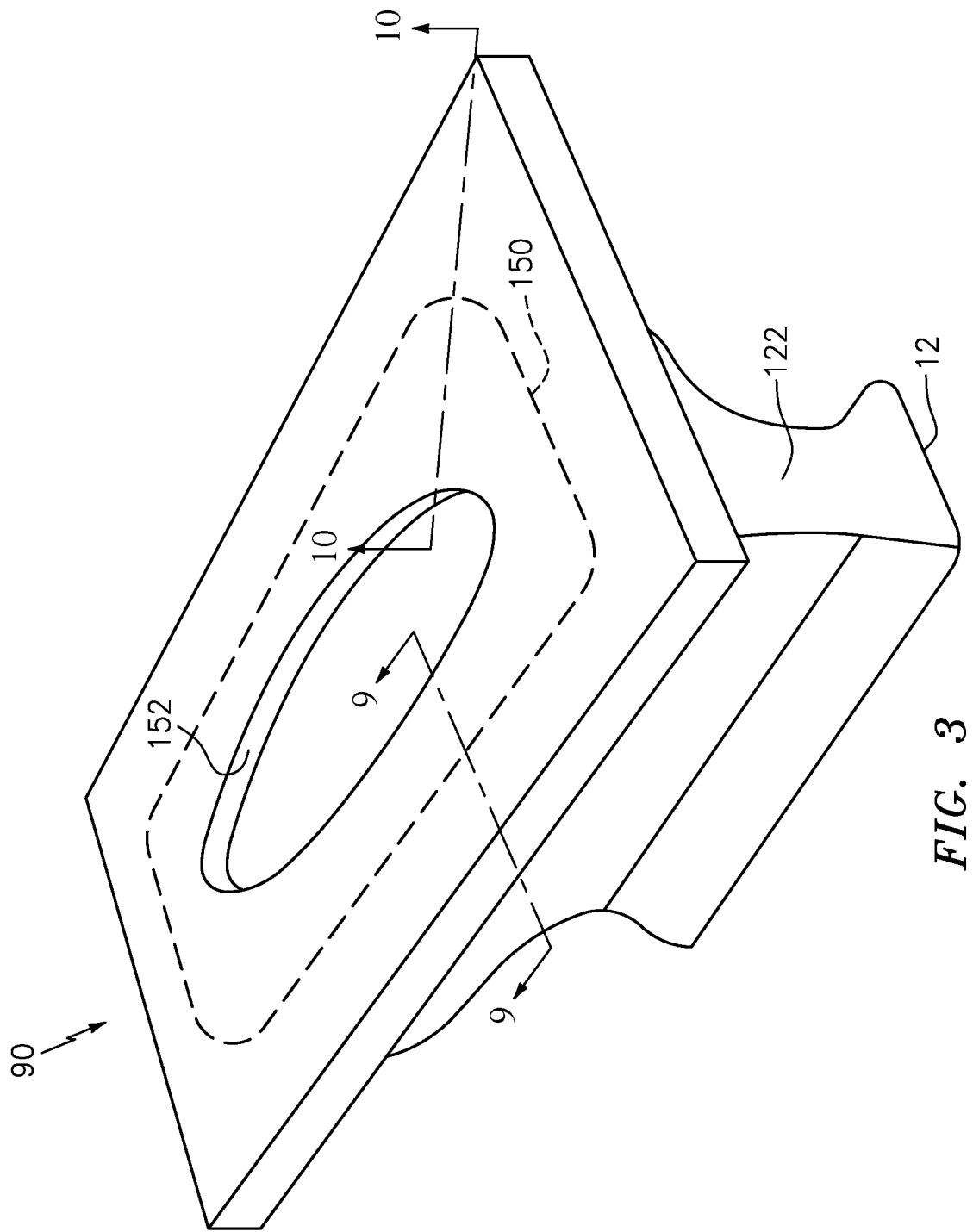
FIG. 3 is a perspective view of a platform shell.
Figure 4:
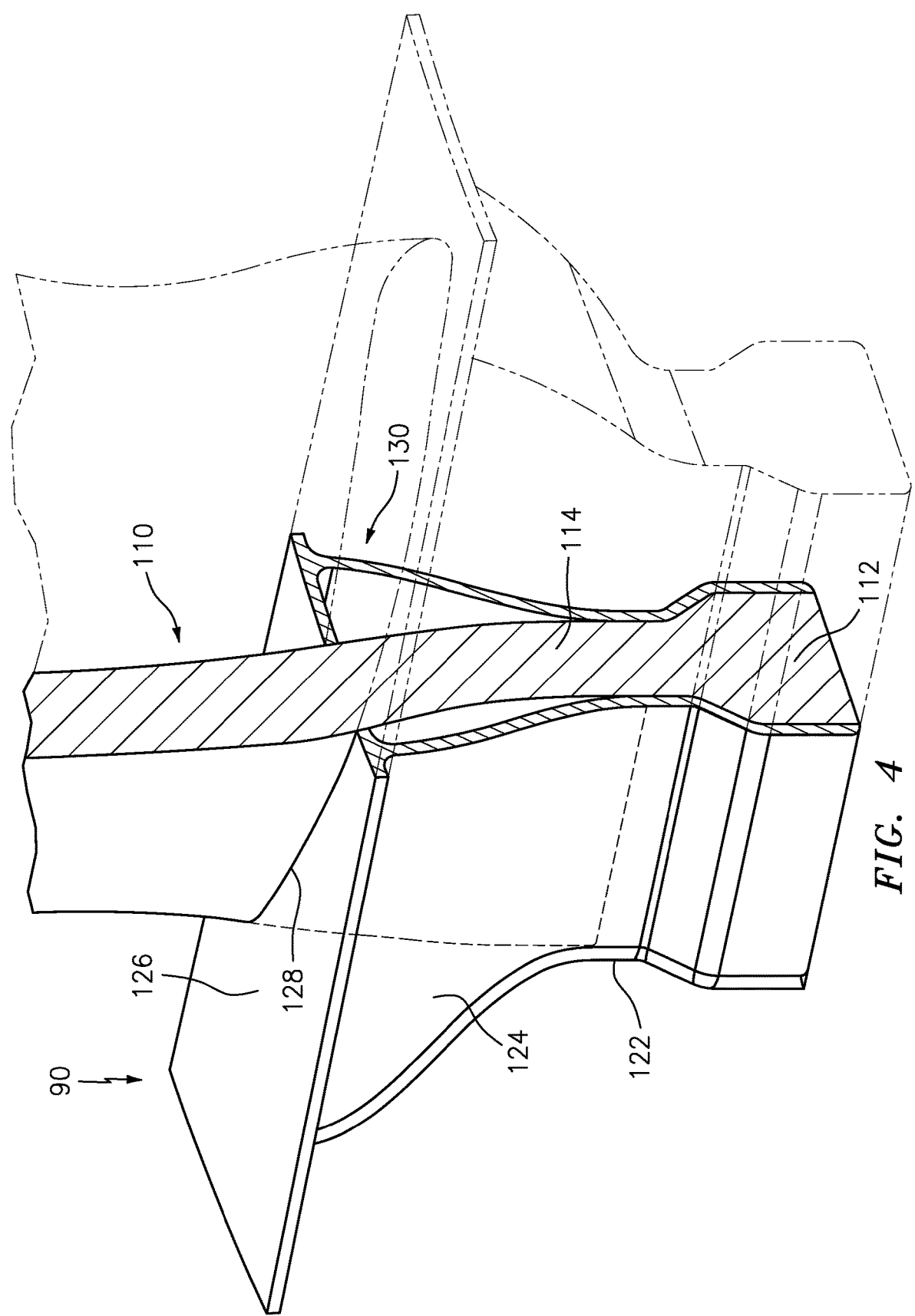
FIG. 4 is a partial phantom view of a rotor blade.
Figure 5:
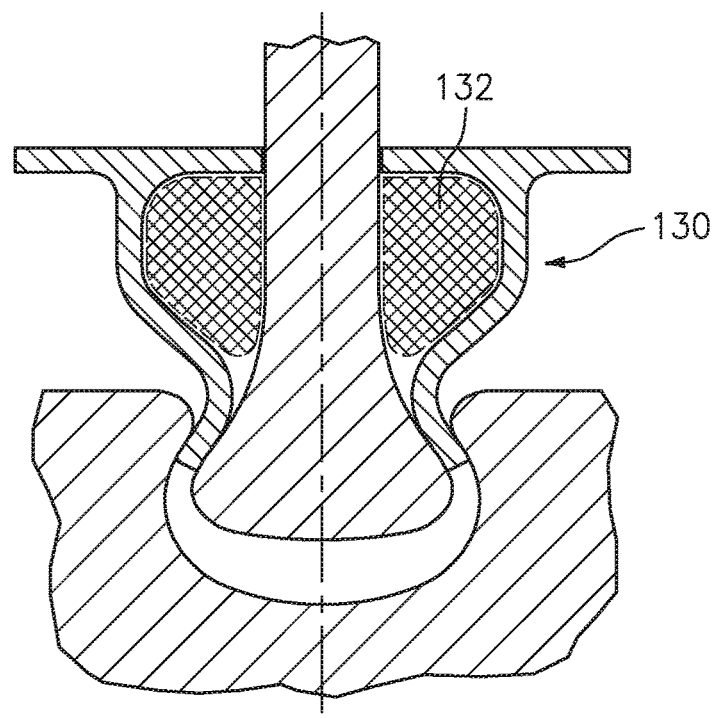
FIG. 5 is a front sectional view of the rotor blade.

With reference to FIGS. 3 and 4, the platform shell 90 generally includes a platform shell root region 120, a platform shell neck region 122 and a platform shell platform region 124. The platform shell root region 120 generally sheathes the flared region 112 then flares outwardly to form a vortical shell 130. The platform shell neck region 122 flares outwardly to form a platform shell neck region perimeter 150 around an airfoil opening perimeter 152 in the platform shell platform region 124. The platform shell neck region 122 tapers away from the inner ply layer group 110 at the platform shell root region 120, then forms the vortical shell 130 of the platform shell platform region 124 (FIG. 4). The platform shell platform region 124T may be generally planar to separate the gas path airflow. The vortical shell 130 is generally the portion of the platform shell 90 that extends away from the inner ply layer group 110 and may be hollow or include a low density ceramic foam 132 (FIG. 5).

Figure 6:
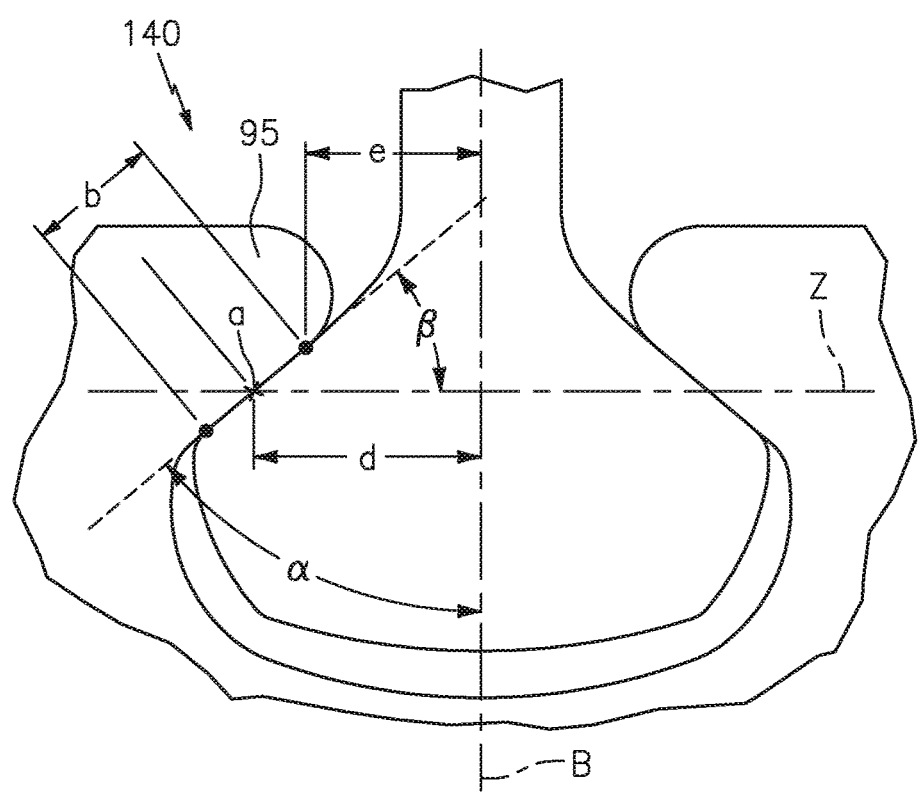
FIG. 6 is a front sectional view of the rotor blade illustrating a contact width C with the blade slot.

With reference to FIG. 6, an attachment surface 140 of the platform shell root region 120 is represented along a contact width C through which the Z plane is defined perpendicular to an axis B of the blade slot 94. The attachment surface 140 is the surface of the platform shell root region 120 upon which a disk attachment lug 95 of the associated blade slot 94 forms the contact width C. The attachment surface 140 along contact width C may be considered a zone of compression. The zone of compression may be represented via a typical bolted joint methodology to calculate the spring rate of the stack in compression.

Figure 7:
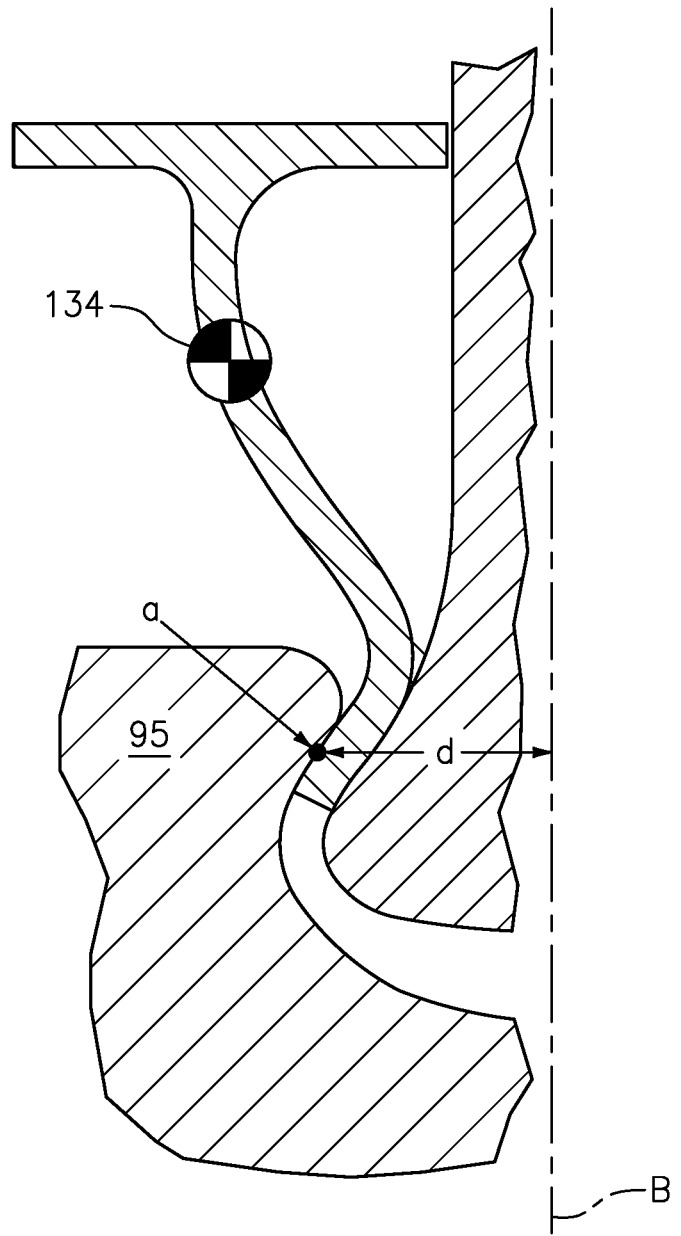
FIG. 7 is an expanded view of the platform shell showing an average center of gravity location outboard of the central point of the contact width.

The platform shell 90 defines a platform shell average center of gravity 134 (FIG. 7) which is located outboard of a center point of the contact a width C at distance d from the axis B. The center point of the contact width C at distance d is center point at which the platform shell root region 120 contacts the disk attachment lug 95 of the associated blade slot 94. The average center of gravity 134 is located to create a net moment operable to rotate the platform shell platform region toward the inner ply layer group 110 to thereby balance the platform shell 90.

Figure 8:
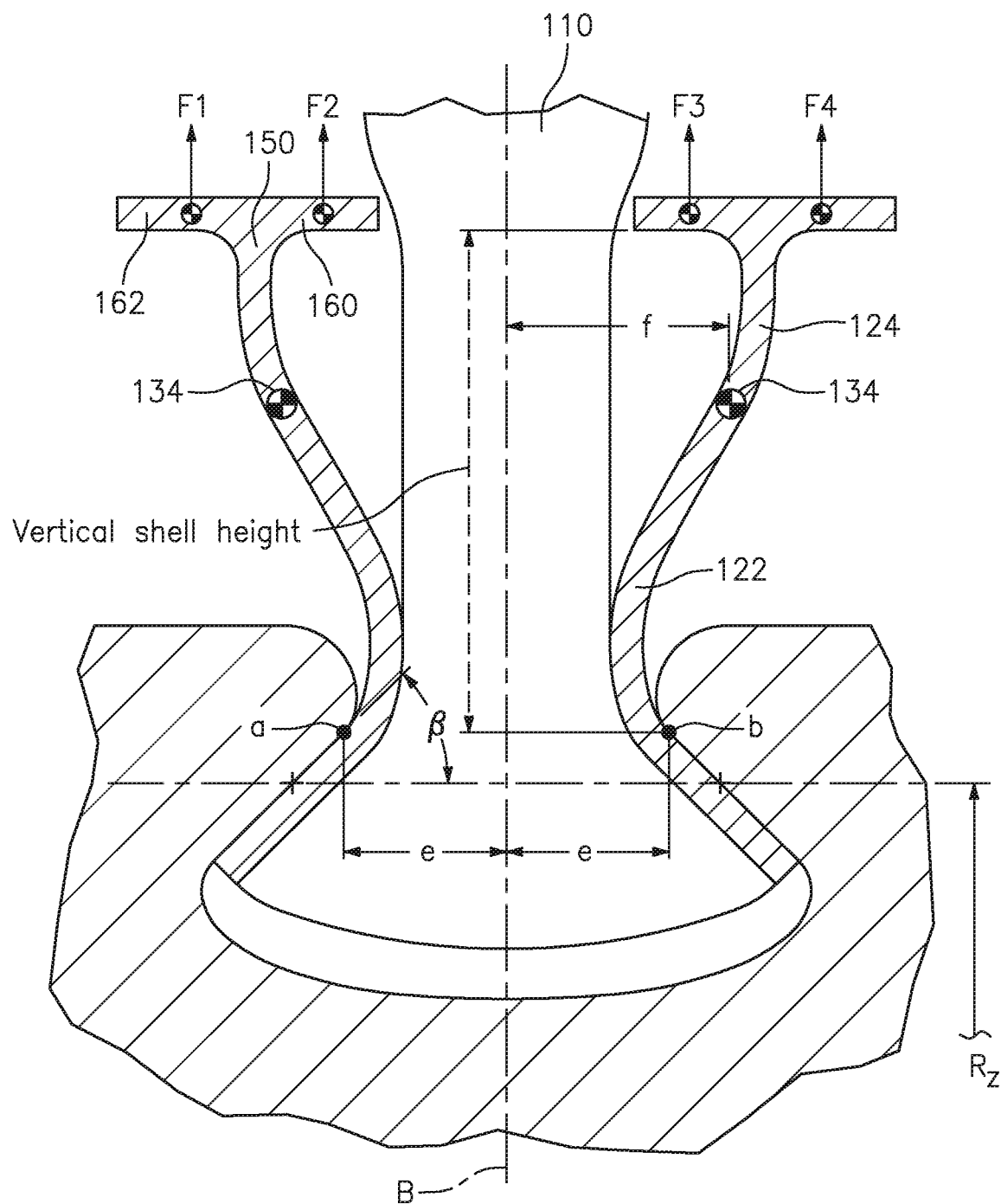
FIG. 8 is a front sectional view of the platform shell illustrating a platform shell platform region of a first thickness inboard of the platform shell neck region perimeter and a second thickness outboard of the platform shell neck region perimeter.
Figure 9:
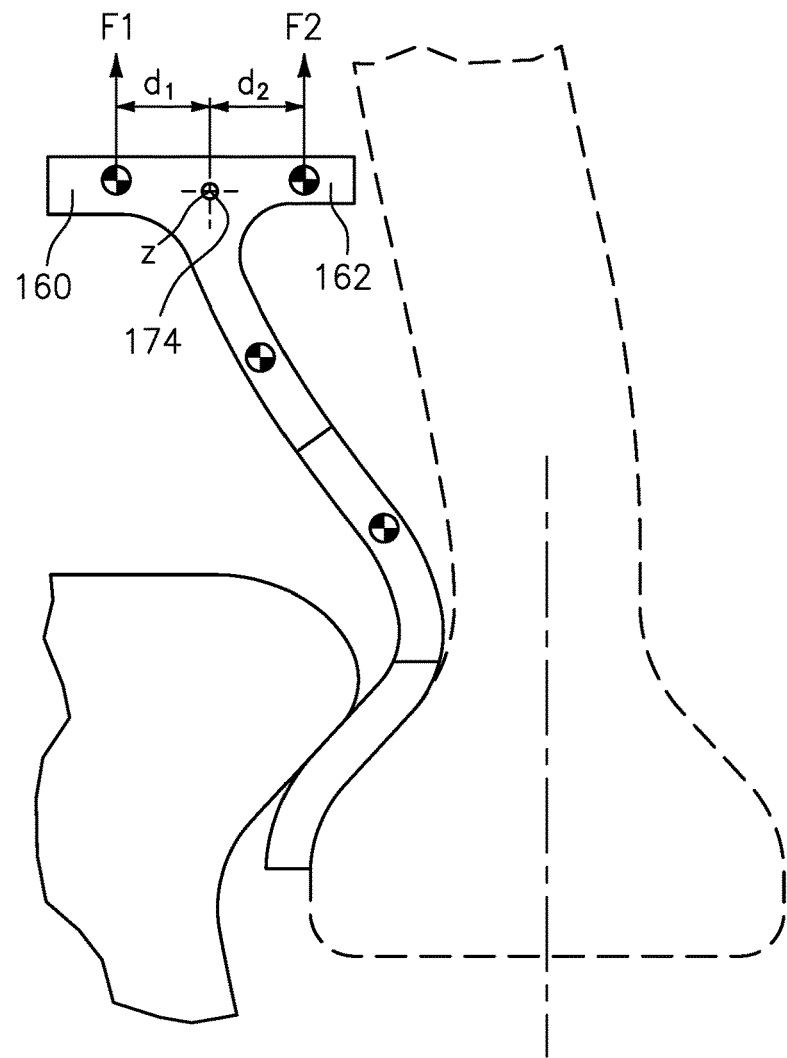
FIG. 9 is a front sectional view through line 9-9 in FIG. 3 of the platform shell platform region.
Figure 10:
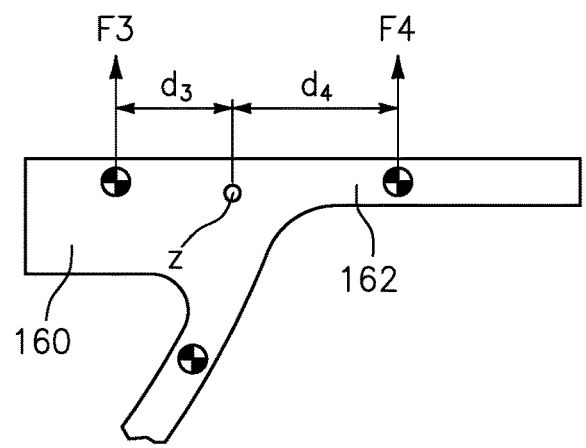
FIG. 10 is a front sectional view through line 10-10 in FIG. 3 of the platform shell platform region.

With reference to FIG. 8, the platform shell neck region 122 flares outwardly to intersect with the platform shell platform region 124 at the platform shell neck region perimeter 150 which surrounds the airfoil opening perimeter 152 through which passes the inner ply layer group 110. The platform shell platform region 124 includes a first thickness 160 outboard of the platform shell neck region perimeter 150 and a second thickness 162 inboard of the platform shell neck region perimeter 150. At various cross-sections through the platform shell platform region 124, the first thickness 160 may different than the second thickness 162 (FIGS. 9 and 10).

Figure 11:
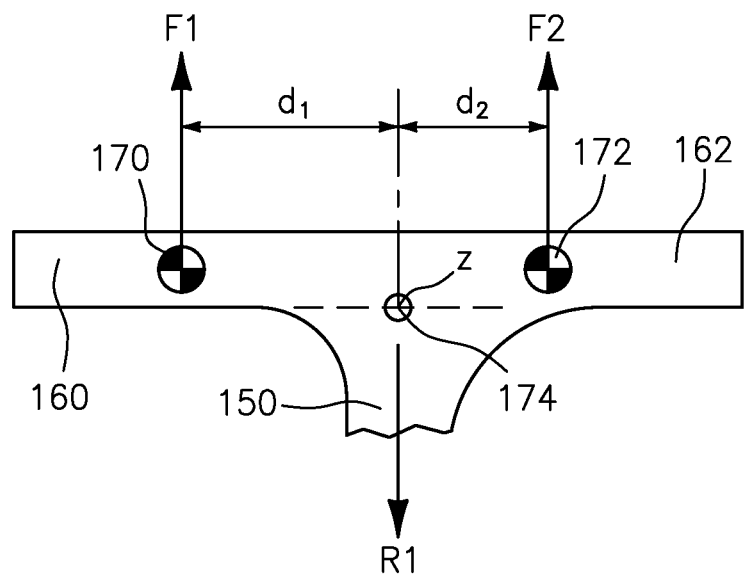
FIG. 11 is a front sectional view of the planar platform shell.

With reference to FIG. 11, the first thickness 160 outboard of the platform shell neck region perimeter 150 defines a first center of gravity 170 at an example first cross-section, and the second thickness 162 inboard of the platform shell neck region perimeter 150 defines a second center of gravity 172 at the example first cross-section. The first center of gravity 170 and the second center of gravity 172 are positioned at each cross-section though the platform shell 90, such as by varying the thicknesses 160, 162 to minimize a rolling moment located at a point z at the intersection 174 on the platform shell neck region perimeter 150.

All sections of the platform shell neck region 122 essentially roll inward toward the inner ply layer group 110 because the platform shell neck region perimeter 150 is vortical. That is, the platform shell neck region perimeter 150 cannot have a smaller perimeter without compression during engine operation which applies the centrifugal force to the blade. The platform shell 90 is thereby self-supporting and forms a compressive load onto the inner ply layer group 110 such that even a potential bond failure between the platform shell 90 and the inner ply layer group 110 does not result in the platform shell 90 peeling away. That is, the platform shell 90 compresses onto the inner ply layer group 110 during operation reducing any stress.

Figure 12:
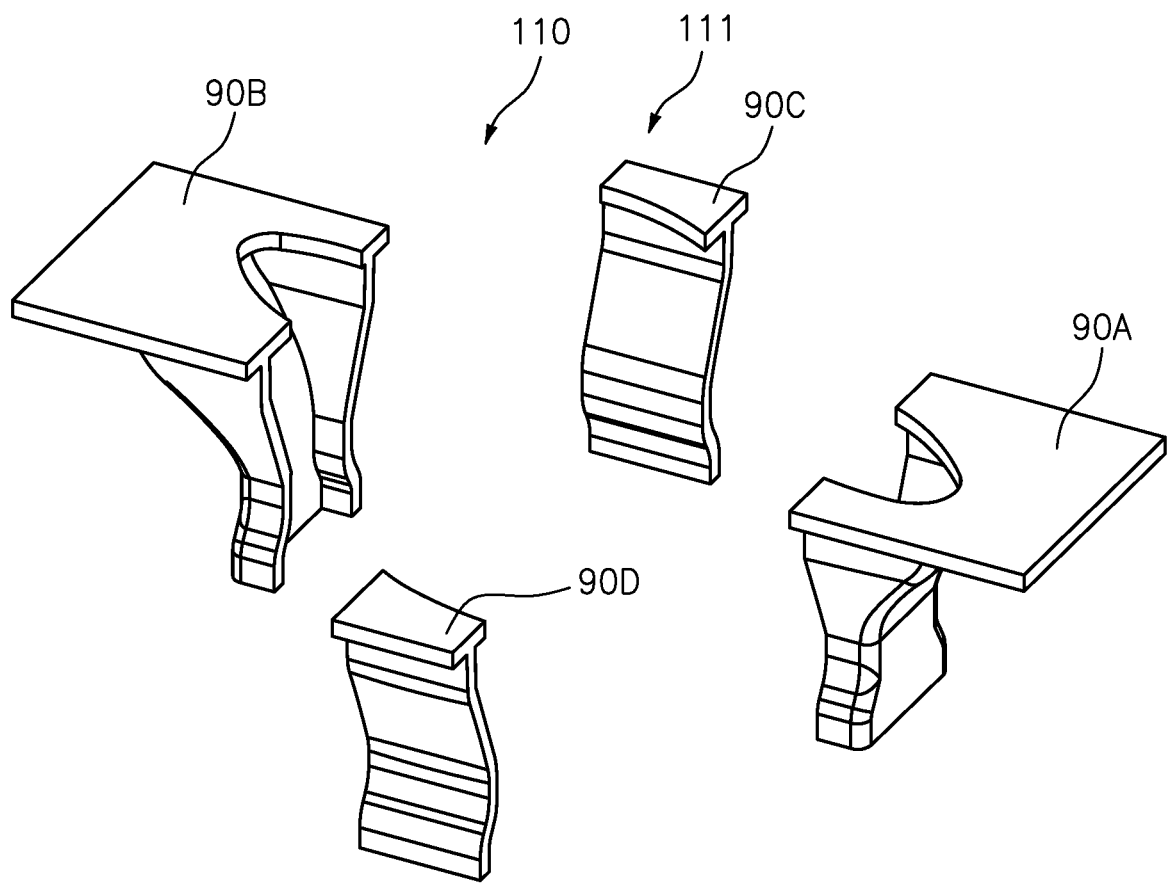
FIG. 12 is an exploded view of the platform shell which is composed of an assembly of four pieces.

With reference to FIG. 12, the platform shell 90 may be assembled as a multiple of platform sections 90A, 90B, 90C, 90D that surround the inner ply layer group 110. Although illustrated as formed in four section that are assembled together, any number of sections may be utilized. The platform sections 90A, 90B, 90C, 90D may be formed as an integral woven ply layup that is later solidified, pre-ceramics which are later solidified, or preformed sections which have already been solidified.

Figure 13:
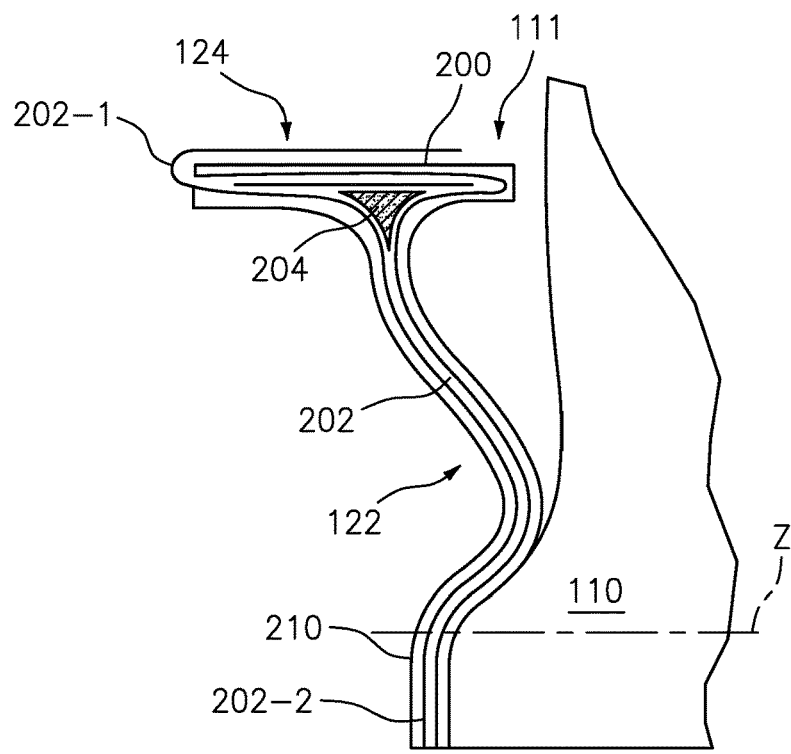
FIG. 13 is sectional view of the platform shell illustrating a first ply arrangement according to one embodiment.

With reference to FIG. 13, in one embodiment, the platform shell 90 may include a stacked ply layer group 200 to form the platform shell platform region 124 transverse to a ply layer group 202 that forms the platform shell neck region 122. The stacked ply layer group 200 facilitates varying the thickness of the platform shell platform region 124. One or more layers 202-1 of the ply layer group 202 may be arranged to at least partially wrap around the stacked ply layer group 200. In one example, the plys may be a woven, tape, or knitted ceramic fabric such as silicon carbide fabric, silicon carbide-carbon fabric or other such material that may be pre-impregnated with a matrix precursor such as a polycarbosilane pre-ceramic matrix precursor or other liquid resin. The plys may be unidirectional plys, 2D woven plys or combinations thereof. A filler 204 such as a low density ceramic foam, may be located to at least partially support the stacked ply layer group 200.

The outermost ply 202-2 of the ply layer group 202 may be silicon plasma sprayed to form a machinable layer 210. The machinable layer 210 permits high tolerance final machining of the contact width C.

Figure 14:
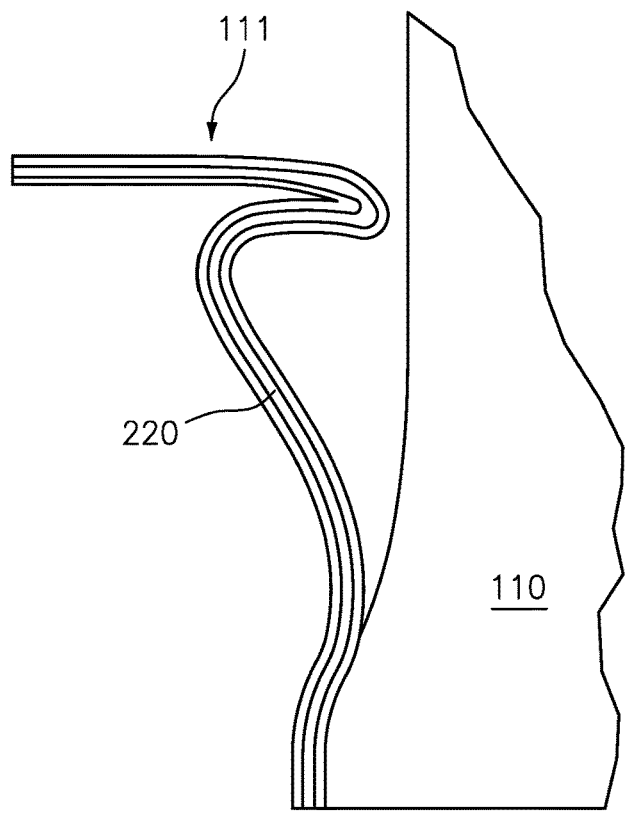
FIG. 14 is sectional view of the platform shell illustrating a first ply arrangement according to another embodiment.

With reference to FIG. 14, in another embodiment, the platform shell 90 may include integrally woven plys 220. The integrally woven plys 220 may contiguously form the platform shell platform region 124, the platform shell neck region 122 and the platform shell root region 120.

Figure 15:
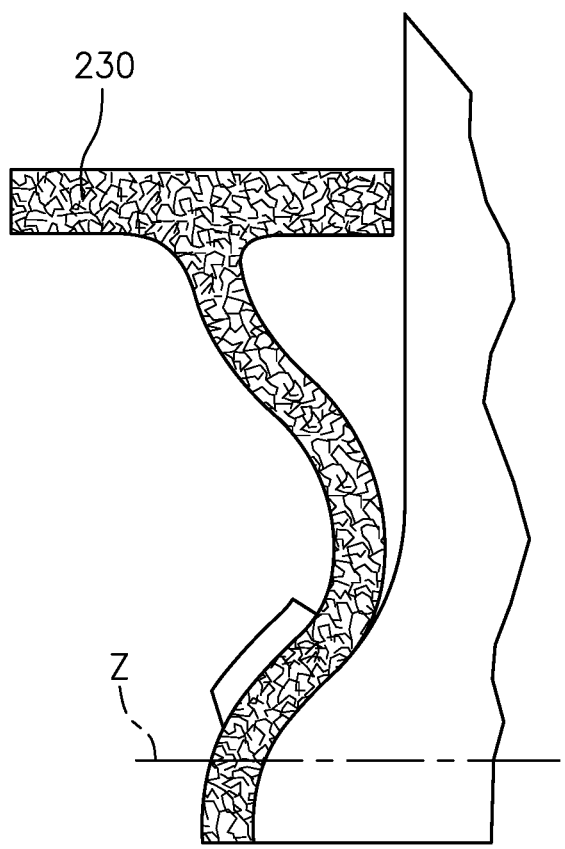
FIG. 15 is sectional view of the platform shell illustrating a first ply arrangement according to another embodiment.

With reference to FIG. 15, in another embodiment, the platform shell 90 may include 3D woven multidirectional plys 230.

Figure 16:
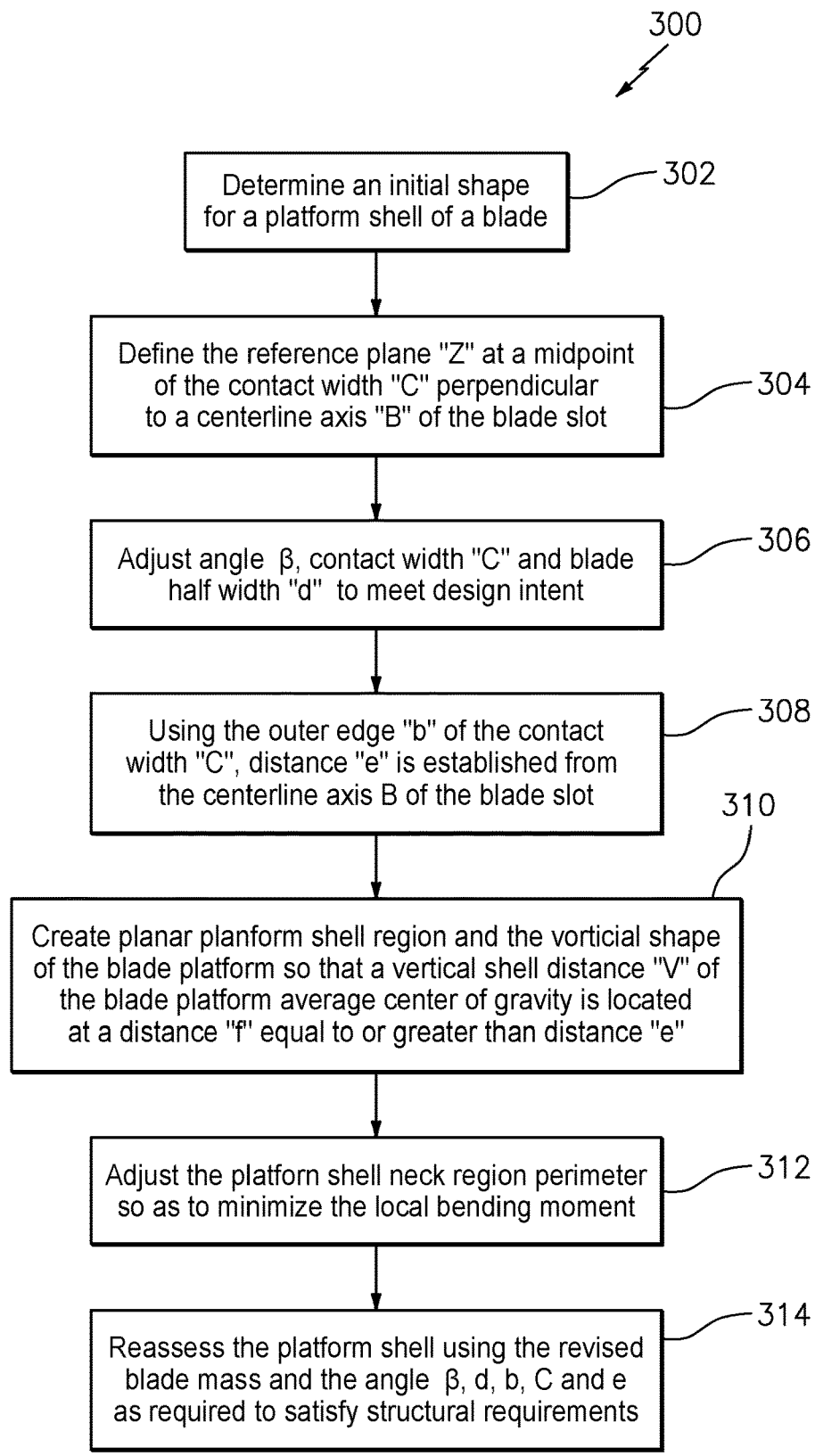
FIG. 16 is a block diagram of a method of manufacturing the platform shell.

With reference to FIG. 16, a method 300 of manufacturing the platform shell 90 includes determining an initial shape of the platform shell 90 based on, for example blade mass, quantity, and general flowpath radius (step 302).

Next, the reference plane Z is defined at a midpoint of the contact width C perpendicular to a centerline axis B of the blade slot 94 (step 304). In this embodiment, the attachment surface may be outwardly oriented at an angle β of about 30-50 degrees with respect to the Z plane and an angle α between the attachment surface and the centerline axis B of the blade slot 94 (FIG. 6). Angle β plus angle α equals Ninety (90) degrees.

Next, angle β, contact width C and blade half width "d" are adjusted to meet design intent (step 306) such as limiting the contact stress between the blade and disk, and adjusting size to limit the net cross-sectional stress to be below a material strength allowable.

Next, using the outer edge b of the contact width C, distance is established from the centerline axis B of the blade slot 94 (step 308).

Next, the platform shell platform region 124 and the vortical shape of the blade platform 90 is created so that a vertical shell distance V of the blade platform average center of gravity is located at a distance f equal to or greater than distance e (FIG. 6; step 310).

Figure 17:
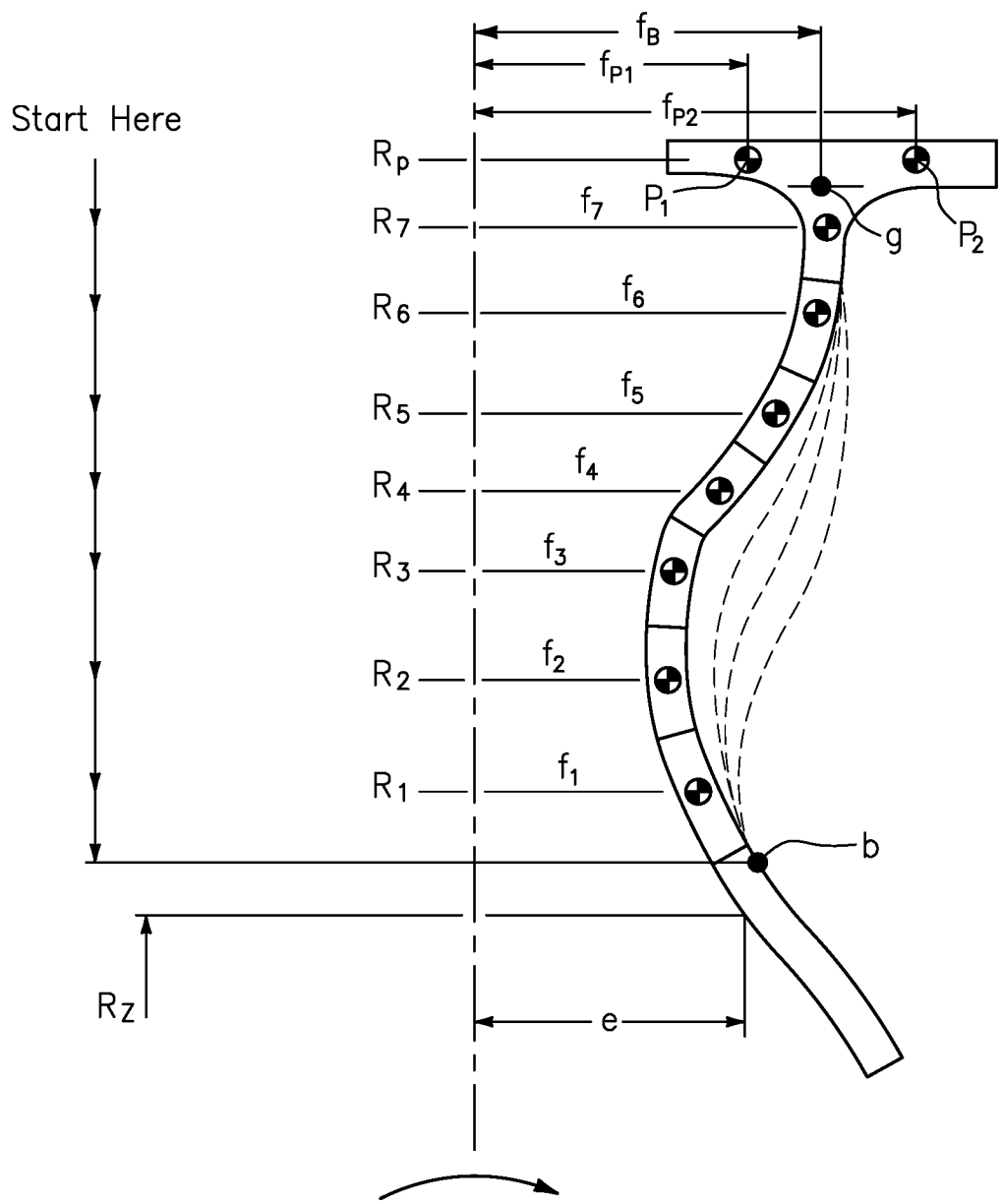
FIG. 17 is a sectional view of the platform shell illustrating a step of the method.

Next, the platform shell neck region perimeter 150 is adjusted so as to minimize the local bending moment. For example, starting at the platform shell platform region 124 a distance F1 to Fn at corresponding radius R1 to Rn are adjusted to minimize bending stresses originating from the cantilevered loads due to rotation velocity of the rotor (FIG. 17; step 312). This constructs a path from point g to point b where the sub-regions additively result in low relative bending stresses. The sections may be adjusted as desired by varying mass and offsets to account for moments and increasing radial loads such that the net result should be vertical shell center of gravity locations which have transitions from one region to the next with a design goal of minimizing local bending moments and maintaining local stresses below established material strength limits.

Finally, the platform shell 90 is then reassessed using the revised blade mass and the angle β, d, b, C, and e as required to satisfy structural requirements (step 314) such as net sectional stress of the blade and disk attachment features. Further refinement may include altering the attachment dimensions in the blade and disk as needed to limit local stress concentrations.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A blade for a gas turbine engine, comprising:
an inner ply layer group comprising a flared region and an airfoil region, a neck region between the flared region and the airfoil region; and
a platform shell that comprises a platform shell root region, a platform shell platform region, and a platform shell neck region between the platform shell root region and the platform shell platform region, the platform shell root region sheathes the flared region, and the platform shell neck region flares outwardly away from the neck region to intersect the platform shell platform region at a platform shell neck region perimeter around an airfoil opening perimeter, wherein the platform shell comprises a platform shell center of gravity located outboard of a center point of a contact width at which the platform shell root region contacts a disk attachment lug of an associated blade slot, the platform shell center of gravity is located to create a net moment operable to rotate the platform shell platform region toward the inner ply layer group, wherein the platform shell neck region at the platform shell platform region roll inward toward the inner ply layer group during operation of the gas turbine engine such that the platform shell neck region operates in compression.

2. The blade as recited in claim 1, wherein the platform shell comprises a multiple of pieces that are assembled together around the inner ply layer group.

3. A blade for a gas turbine engine, comprising:
an inner ply layer group comprising a flared region and an airfoil region, a neck region between the flared region and the airfoil region; and
a platform shell that comprises a platform shell root region, a platform shell platform region, and a platform shell neck region between the platform shell root region and the platform shell platform region, the platform shell root region sheathes the flared region, and the platform shell neck region flares outwardly away from the neck region to intersect the platform shell platform region at a platform shell neck region perimeter around an airfoil opening perimeter, wherein the platform shell neck region flares outwardly to intersect with the platform shell platform region at the platform shell neck region perimeter, the platform shell platform region comprises a first thickness inboard of the platform shell neck region perimeter and a second thickness outboard of the platform shell neck region perimeter, the first thickness different than the second thickness.

4. A blade for a gas turbine engine, comprising:
an inner ply layer group comprising a flared region and an airfoil region, a neck region between the flared region and the airfoil region; and
a platform shell that comprises a platform shell root region, a platform shell platform region, and a platform shell neck region between the platform shell root region and the platform shell platform region, the platform shell root region sheathes the flared region, and the platform shell neck region flares outwardly away from the neck region to intersect the platform shell platform region at a platform shell neck region perimeter around an airfoil opening perimeter, wherein the platform shell neck region flares outwardly to intersect with the platform shell platform region at the platform shell neck region perimeter, the platform shell platform region comprises a first thickness inboard of the platform shell neck region perimeter and a second thickness outboard of the platform shell neck region perimeter, wherein the first thickness inboard of the platform shell neck region perimeter defines a first center of gravity at a first cross-section, and the second thickness outboard of the platform shell neck region perimeter defines a second center of gravity at the first cross-section, the first center of gravity and the second center of gravity positioned to minimize a rolling moment located at a point Z at the first cross-section on the platform shell neck region perimeter during operation of the gas turbine engine.

5. A blade for a gas turbine engine, comprising:
an inner ply layer group comprising a flared region and an airfoil region, a neck region between the flared region and the airfoil region; and
a platform shell that comprises a platform shell root region, a platform shell platform region, and a platform shell neck region between the platform shell root region and the platform shell platform region, the platform shell root region sheathes the flared region, and the platform shell neck region flares outwardly away from the neck region to intersect the platform shell platform region at a platform shell neck region perimeter around an airfoil opening perimeter; and
a low density ceramic foam between the platform shell neck region and the inner ply layer group.

6. A blade for a gas turbine engine, comprising:
an inner ply layer group comprising a flared region and an airfoil region, a neck region between the flared region and the airfoil region; and
a platform shell that comprises a platform shell root region, a platform shell platform region, and a platform shell neck region between the platform shell root region and the platform shell platform region, wherein the platform shell neck region at the platform shell platform region roll inward toward the inner ply layer group during operation of the gas turbine engine such that the platform shell neck region operates in compression.

7. The blade as recited in claim 6, wherein the platform shell root region sheathes the flared region, and the platform shell neck region flares outwardly away from the neck region to intersect the platform shell platform region at a platform shell neck region perimeter.

8. The blade as recited in claim 7, wherein the platform shell neck region perimeter surrounds an airfoil opening perimeter.

9. The blade as recited in claim 8, wherein the platform shell comprises a platform shell center of gravity located outboard of a center point of a contact width at which the platform shell root region contacts a disk attachment lug of an associated blade slot.

10. The blade as recited in claim 8, wherein the platform shell comprises a platform shell center of gravity located outboard of a center point of a contact width at which the platform shell root region contacts a disk attachment lug of an associated blade slot.

11. The blade as recited in claim 10, wherein the platform shell center of gravity is located to create a net moment operable to rotate the platform shell platform region toward the inner ply layer group.

12. The blade as recited in claim 8, wherein the platform shell neck region flares outwardly to intersect with the platform shell platform region at the platform shell neck region perimeter, the platform shell platform region comprises a first thickness inboard of the platform shell neck region perimeter and a second thickness outboard of the platform shell neck region perimeter, the first thickness different than the second thickness.

13. The blade as recited in claim 8, wherein the platform shell neck region flares outwardly to intersect with the platform shell platform region at the platform shell neck region perimeter, the platform shell platform region comprises a first thickness inboard of the platform shell neck region perimeter and a second thickness outboard of the platform shell neck region perimeter, wherein the first thickness inboard of the platform shell neck region perimeter defines a first center of gravity at a first cross-section, and the second thickness outboard of the platform shell neck region perimeter defines a second center of gravity at the first cross-section, the first center of gravity and the second center of gravity positioned to minimize a rolling moment located at a point Z at the first cross-section on the platform shell neck region perimeter.

14. A method of manufacturing a rotor blade of a gas turbine engine, comprising:

determining a platform shell center of gravity to be outboard of a center point of a contact width at which a platform shell root region contacts a disk attachment lug of an associated blade slot; and adjusting an intersection of a platform shell neck region that flares outwardly away from a neck region of an inner ply region to intersect the platform shell platform region at a platform shell neck region perimeter around an airfoil opening to minimize a local bending moment.

15. The method as recited in claim 14, wherein the platform shell neck region is between a platform shell root region and the platform shell platform region.

16. The method as recited in claim 15, wherein the platform shell neck region is between a platform shell root region and the platform shell platform region, the platform shell root region sheathing a flared region that defines the center point of the area of contact.

17. The method as recited in claim 14, wherein adjusting the intersection further comprises adjusting the platform shell platform region to roll inward toward the inner ply layer group during operation of the gas turbine engine.

18. The method as recited in claim 17, wherein the platform shell neck region operates in compression.

* * * * *